Jan. 5, 1937.   C. E. BENNETT   2,066,323
ELECTRIC CABLE SYSTEM
Filed Dec. 7, 1935
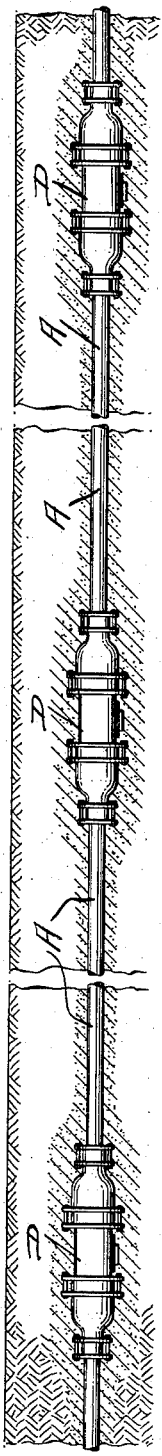
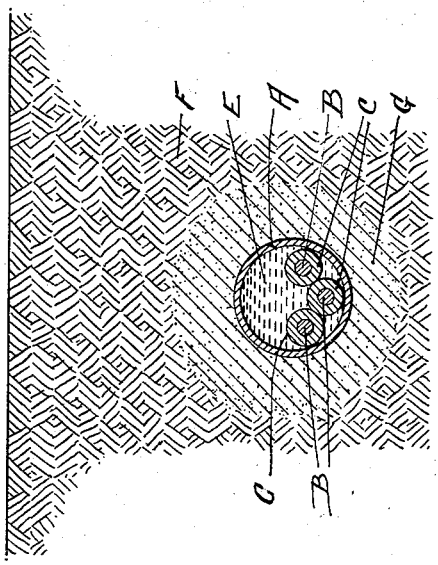
INVENTOR
Charles E. Bennett
BY
Kiddle, Bethell and Montgomery.
ATTORNEYS.

Patented Jan. 5, 1937

2,066,323

UNITED STATES PATENT OFFICE 2,066,323

ELECTRIC CABLE SYSTEM

Charles E. Bennett, Ridgewood, N. J., assignor to The Okonite-Callender Cable Company, Incorporated, Paterson, N. J., a corporation of New Jersey Application December 7, 1935, Serial No. 53,345

16 Claims. (Cl. 247—3)

This invention relates to electric distribution systems particularly adapted for use in connection with the distribution of power for street lighting, house lighting and other domestic or commercial loads, and has for one of its objects the provision of a construction wherein overhead lines are dispensed with, the feeder lines for the system being installed underground in a pipe line, the transformers by which the power from the feeder line is stepped down being installed directly in the pipe line. The pipe line is filled with a fluid, either oil or gas, in which the insulated conductors and transformers are immersed. Such a construction presents many advantages as compared with existing systems. For example, it eliminates overhead lines, expensive manholes and the need for high voltage transformer bushings, the cable being tapped to the bus which serves the transformer. Space requirements and installation costs are also reduced to a minimum. Inasmuch as the entire transformer construction is enclosed in a pipe line and immersed in the fluid therein there are no external connections on the high side. This obviously eliminates the constant likelihood of bushing failure and insures good thermal condition so far as the transformer is concerned.

It will be appreciated also that the present construction materially improves the appearance of the property on which it is installed, all equipment being buried. It will be further appreciated that heavy maintenance costs, due to tree trimming, damage caused by lightning and storms, changes in driveways, etc. on the property are eliminated by the present invention.

In addition to all of the foregoing the present invention has for an object the provision of a distribution system such as briefly outlined above in which means are provided whereby heat, generated for example due to localized losses at the transformer locations, will be dissipated, thereby insuring at all times ideal operating conditions.

More specifically the present invention provides a distribution system in which the insulated cable conductors and transformers are installed in a pipe line which is buried directly in the earth which has been treated to increase its heat absorbing and conducting characteristics, thereby increasing the radiating characteristics of the system.

In the accompanying drawing:

Fig. 1 is a more or less diagrammatic view of my improved system; and

Fig. 2 is a cross sectional view.

Referring to the drawing in detail, A designates a pipe line of heat conducting material such as steel or iron, for example, this pipe line containing the cable conductors B insulated with paper or other suitable insulation C.

At intervals in the pipe line I install the transformers for the system. These transformers are installed directly in the line as indicated at D on the drawing. The whole line is maintained filled with oil, a gas such as hydrogen, or other suitable fluid, designated E in Fig. 2, this fluid being preferably maintained under sufficiently high pressure to increase its dielectric strength. For example a pressure of five atmospheres minimum.

The details of the transformer construction and the electrical connection of the transformers to the conductors of the system constitute the subject matter of my copending application Serial No. 46,064, filed October 22, 1935.

As above mentioned one of the objects of the present invention is to bury the entire system directly in the ground, the earth surrounding the system at the transformer locations being treated to increase its heat absorbing characteristics. In this connection carbon black, calcium chloride, copper sulphate or any other suitable material G which will increase the heat absorbing characteristics of the earth is added to the earth F with which the system adjacent the transformer locations is back-filled. It will be understood that in practice it will merely be necessary to mix this material with the earth before back-filling, although if desired the system can be back-filled and this material added by forcing the same into the ground. It will be appreciated also that from time to time more material may be added if deemed necessary or desirable, and also that water may be added if desired.

It will be apparent from all of the foregoing that the present invention provides a distribution system in which the conductors of the system and the transformers are all contained within a pipe line which is buried in the ground, the pipe line containing a fluid in which the conductors and transformers are immersed, the back-fill adjacent the transformer locations being treated to increase its heat absorbing characteristics, and hence the radiating characteristics of the system, thereby insuring ideal operating conditions at all times so far as thermal conditions are concerned.

What I claim is:—

1. A buried electric distribution system comprising in combination a pipe line, insulated conductors in the pipe line, a transformer within said pipe line and electrically connected to said conductors, said pipe line being filled with a fluid in which said insulated conductors and transformer are immersed, the said pipe line being of heat conducting material and buried in earth which has been treated to increase its heat absorbing characteristics whereby the radiating characteristics of the system are improved.

2. A buried electric distribution system comprising in combination a pipe line, insulated conductors in the pipe line, a transformer within said pipe line and electrically connected to said conductors, said pipe line being filled with a fluid in which said insulated conductors and transformer are immersed, the said pipe line being of heat conducting material and buried in earth to which calcium chloride has been added to increase its heat absorbing characteristics.

3. A buried electric distribution system comprising in combination a pipe line, insulated conductors in the pipe line, a transformer within said pipe line and electrically connected to said conductors, said pipe line being filled with a fluid in which said insulated conductors and transformer are immersed, the said pipe line being of heat conducting material and buried in earth to which carbon black has been added.

4. A buried electric distribution system comprising in combination a pipe line, insulated conductors in the pipe line, a transformer within said pipe line and electrically connected to said conductors, said pipe line being filled with a fluid in which said insulated conductors and transformer are immersed, the said pipe line being of heat conducting material and buried in earth to which copper sulphate has been added.

5. A buried electric distribution system comprising in combination a pipe line, insulated conductors in the pipe line, a transformer within said pipe line electrically connected to said conductors, a liquid in the pipe line in which said insulated conductors and transformer are immersed, said pipe line being of heat conducting material and buried in earth which has been treated to increase its heat absorbing characteristics and hence the radiating characteristics of the system.

6. A buried electric distribution system comprising in combination a pipe line, insulated conductors in the pipe line, a transformer within said pipe line electrically connected to said conductors, a liquid in the pipe line in which said insulated conductors and transformer are immersed, said pipe line being of heat conducting material and buried in earth to which calcium chloride has been added to increase its heat absorbing characteristics.

7. A buried electric distribution system comprising in combination a pipe line, insulated conductors in the pipe line, a transformer within said pipe line electrically connected to said conductors, a liquid in the pipe line in which said insulated conductors and transformer are immersed, said pipe line being of heat conducting material and buried in earth to which carbon black has been added to increase its heat absorbing characteristics.

8. A buried electric distribution system comprising in combination a pipe line, insulated conductors in the pipe line, a transformer within said pipe line electrically connected to said conductors, a liquid in the pipe line in which said insulated conductors and transformer are immersed, said pipe line being of heat conducting material and buried in earth to which copper sulphate has been added to increase its heat absorbing characteristics.

9. A buried electric distribution system comprising in combination a pipe line, insulated conductors in the pipe line, a transformer within said pipe line electrically connected to said conductors, an insulating fluid in said pipe line in which said insulated conductors and transformer are immersed, said fluid being under sufficiently high pressure to increase its dielectric strength, said pipe line being of heat conducting material and buried in earth which has been treated to increase its heat absorbing characteristics and hence the radiating characteristics of the same.

10. A buried electric distribution system comprising in combination a pipe line, insulated conductors in the pipe line, a transformer within said pipe line electrically connected to said conductors, an insulating fluid in said pipe line in which said insulated conductors and transformer are immersed, said fluid being under sufficiently high pressure to increase its dielectric strength, said pipe line being of heat conducting material and buried in earth mixed with calcium chloride.

11. A buried electric distribution system comprising in combination a pipe line, insulated conductors in the pipe line, a transformer within said pipe line electrically connected to said conductors, an insulating fluid in said pipe line in which said insulated conductors and transformer are immersed, said fluid being under sufficiently high pressure to increase its dielectric strength, said pipe line being buried in earth mixed with carbon black.

12. A buried electric distribution system comprising in combination a pipe line, insulated conductors in the pipe line, a transformer within said pipe line electrically connected to said conductors, an insulating fluid in said pipe line in which said insulated conductors and transformer are immersed, said fluid being under sufficiently high pressure to increase its dielectric strength, said pipe line being buried in earth mixed with copper sulphate.

13. A buried electric distribution system comprising in combination a pipe line, insulated conductors in the pipe line, a transformer within said pipe line electrically connected to said conductors, oil in said pipe line in which said insulated conductors and transformer are immersed, said oil being under sufficiently high pressure to increase its dielectric strength, said pipe line being of heat conducting material and buried in earth which has been treated to increase its heat absorbing characteristics thereby to increase the radiating characteristics of the system.

14. A buried electric distribution system comprising in combination a pipe line, insulated conductors in the pipe line, a transformer within said pipe line electrically connected to said conductors, oil in said pipe line in which said insulated conductors and transformer are immersed, said oil being under sufficiently high pressure to increase its dielectric strength, said pipe line being of heat conducting material and buried in earth mixed with calcium chloride.

15. A buried electric distribution system comprising in combination a pipe line, insulated conductors in the pipe line, a transformer within said pipe line electrically connected to said conductors, oil in said pipe line in which said insulated conductors and transformer are immersed, said oil being under sufficiently high pressure to increase its dielectric strength, said pipe line being of heat conducting material and buried in earth mixed with carbon black.

16. A buried electric distribution system comprising in combination a pipe line, insulated conductors in the pipe line, a transformer within said pipe line electrically connected to said conductors, oil in said pipe line in which said insulated conductors and transformer are immersed, said oil being under sufficiently high pressure to increase its dielectric strength, said pipe line being of heat conducting material and buried in earth mixed with copper sulphate.

CHARLES E. BENNETT.